United States Patent
Wang

(10) Patent No.: US 11,792,195 B2
(45) Date of Patent: Oct. 17, 2023

(54) COMMUNICATION METHOD, SYSTEM AND DEVICE AND COMPUTER-READABLE STORAGE MEDIUM

(71) Applicant: INSPUR SUZHOU INTELLIGENT TECHNOLOGY CO., LTD., Suzhou (CN)

(72) Inventor: Weirong Wang, Suzhou (CN)

(73) Assignee: INSPUR SUZHOU INTELLIGENT TECHNOLOGY CO., LTD., Suzhou Jiangsu (CN)

(*) Notice: Subject to any disclaimer, the term of this patent is extended or adjusted under 35 U.S.C. 154(b) by 32 days.

(21) Appl. No.: 17/764,287

(22) PCT Filed: Dec. 30, 2019

(86) PCT No.: PCT/CN2019/129977
§ 371 (c)(1),
(2) Date: Mar. 28, 2022

(87) PCT Pub. No.: WO2021/056910
PCT Pub. Date: Apr. 1, 2021

(65) Prior Publication Data
US 2022/0368693 A1 Nov. 17, 2022

(30) Foreign Application Priority Data
Sep. 29, 2019 (CN) .......................... 201910931200.1

(51) Int. Cl.
*H04L 29/06* (2006.01)
*H04L 9/40* (2022.01)
*H04L 49/00* (2022.01)

(52) U.S. Cl.
CPC ........ *H04L 63/101* (2013.01); *H04L 49/3027* (2013.01); *H04L 63/123* (2013.01)

(58) Field of Classification Search
CPC .. H04L 63/101; H04L 49/3027; H04L 63/123
See application file for complete search history.

(56) References Cited

U.S. PATENT DOCUMENTS 7,529,811 B2 * 5/2009 Thompson ............ G06F 16/284
707/999.005
9,405,602 B1 * 8/2016 Verne .................... G06F 9/4881
(Continued)

FOREIGN PATENT DOCUMENTS

CN      1595363 A    3/2005
CN    101369302 A    2/2009
(Continued)

OTHER PUBLICATIONS

Tao Zhang et al.; Windows—"The Design and Implemention of Windows System Access Control based on Process Monitoring", Information Network Security, Issue 04, Date: Apr. 30, 2014; ISSN; 1671-1122, subsections 1.3, subsection 2.3, 7 pages, (machine English translation, 14 pages).
(Continued)

*Primary Examiner* — Shin-Hon (Eric) Chen
(74) *Attorney, Agent, or Firm* — DINSMORE & SHOHL LLP

(57) ABSTRACT

A communication method, system, device and computer-readable storage medium are applicable to a Windows system. The method involves: determining a media file used when communicating through a message queue; acquiring identification information of a communication sender; and adding the identification information to an access control list of the media file, such that the communication sender can access the media file, so that the communication sender can communicate through the message queue. Identification information of the communication sender is added to the access control list of the media file, increasing the probability that the communication sender successfully accesses the (Continued)

media file, and thereby improving the success rate of the communication sender through the message queue, and improving the communication stability of the Windows system.

4 Claims, 4 Drawing Sheets

(56) References Cited

U.S. PATENT DOCUMENTS

| | | | |
|---|---|---|---|
| 10,410,000 | B1 | 9/2019 | Ghafourifar et al. |
| 2002/0124053 | A1* | 9/2002 | Adams .................... G06F 9/468 709/219 |
| 2004/0221163 | A1 | 11/2004 | Jorgensen et al. |
| 2004/0226023 | A1 | 11/2004 | Tucker |
| 2006/0015741 | A1* | 1/2006 | Carroll ................ H04L 63/101 713/182 |
| 2006/0059253 | A1 | 3/2006 | Goodman et al. |
| 2007/0110074 | A1 | 5/2007 | Bradley et al. |
| 2010/0095332 | A1 | 4/2010 | Gran et al. |
| 2012/0151552 | A1* | 6/2012 | Kandasamy ........ G06F 21/6281 726/1 |
| 2014/0012981 | A1 | 1/2014 | Samuell et al. |
| 2014/0115496 | A1 | 4/2014 | Zhu et al. |
| 2015/0302184 | A1* | 10/2015 | Kargman .............. G06F 21/126 726/22 |
| 2019/0258811 | A1* | 8/2019 | Ferraiolo ............ G06F 21/6218 |
| 2020/0042366 | A1* | 2/2020 | Ganesh ............... G06F 9/45545 |

FOREIGN PATENT DOCUMENTS

| | | |
|---|---|---|
| CN | 101515241 A | 8/2009 |
| CN | 102112990 A | 6/2011 |
| CN | 103218564 A | 7/2013 |
| CN | 105204950 A | 12/2015 |
| CN | 108768948 A | 11/2018 |
| CN | 109086146 A | 12/2018 |
| CN | 109885410 A | 6/2019 |
| CN | 109933441 A | 6/2019 |
| CN | 110086883 A | 8/2019 |
| EP | 1475707 A2 | 10/2004 |
| WO | 2016181383 A2 | 11/2016 |

OTHER PUBLICATIONS

China National Intellectual Property Administration (CN/ISA); Written Opinion of corresponding application PCT/CN2019/129977; dated May 21, 2020; pp. 1-3.

China National Intellectual Property Administration (CN/ISA); International Search Report of corresponding application PCT/CN2019/129977; dated May 27, 2020; pp. 1-3.

Tao Zhang et al.; Windows—"Design and Implementation of User Rights Control System Based on Windows Kernel Mode Process Monitoring"; Information Network Security, Issue 04, Date: Apr. 30, 2014; ISSN: 1671-1122, subsections 1.3, subsection 2.3.

First Office Action in Corresponding Chinese Application No. 201910931200.1, 7 pages.

Extended European Search Report of Corresponding EP Application No. 19946614.5, 8 pages.

* cited by examiner

COMMUNICATION METHOD, SYSTEM AND DEVICE AND COMPUTER-READABLE STORAGE MEDIUM

This application is a U.S. national stage application under 35 U.S.C. § 371 of PCT International Application Serial No. PCT/CN2019/129977, filed Dec. 30, 2019, which claims priority to Chinese patent application No. 201910931200.1, entitled "COMMUNICATION METHOD, SYSTEM AND DEVICE AND COMPUTER-READABLE STORAGE MEDIUM", filed with the China National Intellectual Property Administration on Sep. 29, 2019, the disclosures of which are hereby incorporated by reference in their entirety.

TECHNICAL FIELD

The present application relates to the field of computer software technologies, and more specifically, to a communication method, system and device and a computer-readable storage medium.

BACKGROUND ART

In the C++ language, the Boost libraries provide the C++ language with a large number of easy-to-use and cross-platform function implementations. Boost is a general term for a number of C++ language libraries that provide extensions to the C++ standard libraries, and is developed and maintained by the Boost community. The Boost libraries may work perfectly with the C++ standard libraries and provide the C++ standard libraries with extended functions. Among these function implementations, a message_queue function of an interprocess module may implement a blocking inter-process communication function without waiting. A message queue has been widely applied in the C++ field for its easy-to-use and non-dependent features.

However, when a message queue is applied to a Windows system and user group permissions of both sides of inter-process communication are different, the communication may fail, leading to relatively unstable communication of the Windows system.

In summary, how to improve the communication stability of a Windows system is currently a pressing problem for a person skilled in the art to solve.

SUMMARY OF THE INVENTION

An objective of the present application is to provide a communication method, which can solve to some extent the technical problem of how to improve the communication stability of a Windows system. The present application further provides a communication method, system and device and a computer-readable storage medium.

To achieve the foregoing objective, the following technical solutions are provided in the present application.

A communication method is applied to a Windows system, and includes:
determining a media file used when communicating through a message queue;
acquiring identification information of a communication sender; and
adding the identification information to an access control list of the media file, such that the communication sender can access the media file, so that the communication sender can communicate through the message queue.

Preferably, before the determining a media file used when communicating through a message queue, the method further includes:
determining if the communication is performed through the message queue for the first time, and if the communication is performed through the message queue for the first time, performing the step of determining a media file used when communicating through a message queue, or if the communication is not performed through the message queue for the first time, ending the process.

Preferably, before the acquiring identification information of a communication sender, the method further includes:
determining if the identification information exists in the access control list, and if the identification information does not exist in the access control list, performing the step of acquiring identification information of a communication sender, or if the identification information exists in the access control list, ending the process.

Preferably, the determining if the identification information exists in the access control list includes:
acquiring an access control entry (ACE) instance of a current discretionary access control list (DACL) from the access control list; and
determining if the identification information exists in the ACE instance, and if the identification information exists in the ACE instance, determining that the identification information exists in the access control list, or if the identification information does not exist in the ACE instance, determining that the identification information does not exist in the access control list.

Preferably, before the adding the identification information to an access control list of the media file, the method further includes:
acquiring a security descriptor of the media file; and
generating a new security descriptor based on the security descriptor; and
after the adding the identification information to an access control list of the media file, the method further includes:
setting the access control list in the new security descriptor; and
setting the new security descriptor in a corresponding file.

Preferably, after the setting the new security descriptor in a corresponding file, the method further includes:
performing a memory release operation to release corresponding memory.

Preferably, after the adding the identification information to an access control list of the media file, the method further includes:
prompting the communication sender to communicate through the message queue.

A communication system is applied to a Windows system, and includes:
a first determining module, configured to determine a media file used when communicating through a message queue;
a first acquisition module, configured to acquire identification information of a communication sender; and
a first addition module, configured to add the identification information to an access control list of the media file, such that the communication sender can access the media file, so that the communication sender can communicate through the message queue.

A communication device is applied to a Windows system, and includes:
a memory, configured to store a computer program; and
a processor, configured to execute the computer program to implement the steps of any foregoing method.

A computer-readable storage medium is applied to a Windows system, the computer-readable storage medium storing a computer program, the computer program being executed by a processor to implement the steps of any foregoing communication method.

A communication method provided in the present application is applied to a Windows system, and includes: determining a media file used when communicating through a message queue; acquiring identification information of a communication sender; and adding the identification information to an access control list of the media file, such that the communication sender can access the media file, so that the communication sender can communicate through the message queue. In the communication method provided in the present application, identification information of the communication sender is added to the access control list of the media file, increasing the probability that the communication sender successfully accesses the media file, and thereby improving the success rate of the communication sender through the message queue, and improving the communication stability of the Windows system. The communication system and device and computer-readable storage medium provided in the present application also solve a corresponding technical problem.

BRIEF DESCRIPTION OF THE DRAWINGS

To describe the technical solutions in the embodiments of the present invention or the prior art more clearly, the following briefly introduces the accompanying drawings required for describing the embodiments or the prior art. Apparently, the accompanying drawings in the following description show merely embodiments of the present invention, and a person of ordinary skill in the art may still derive other drawings from the provided accompanying drawings without creative efforts.

DETAILED DESCRIPTION OF THE EMBODIMENTS

The following clearly and completely describes the technical solutions in embodiments of the present invention with reference to the accompanying drawings in embodiments of the present invention. Apparently, the described embodiments are some rather than all of the embodiments of the present invention. All other embodiments acquired by persons of ordinary skill in the art based on the embodiments of the present invention without creative efforts shall fall within the protection scope of the present invention.

In the C++ language, the Boost libraries provide the C++ language with a large number of easy-to-use and cross-platform function implementations. Boost is a general term for a number of C++ language libraries that provide extensions to the C++ standard libraries, and is developed and maintained by the Boost community. The Boost libraries may work perfectly with the C++ standard libraries and provide the C++ standard libraries with extended functions. Among these function implementations, a message_queue function of an interprocess module may implement a blocking inter-process communication function without waiting. A message queue has been widely applied in the C++ field for its easy-to-use and non-dependent features. However, when a message queue is applied to a Windows system and user group permissions of both sides of inter-process communication are different, the communication may fail, leading to relatively unstable communication of the Windows system. A communication method provided in the present application can improve the communication stability of a Windows system.

Figure 1:
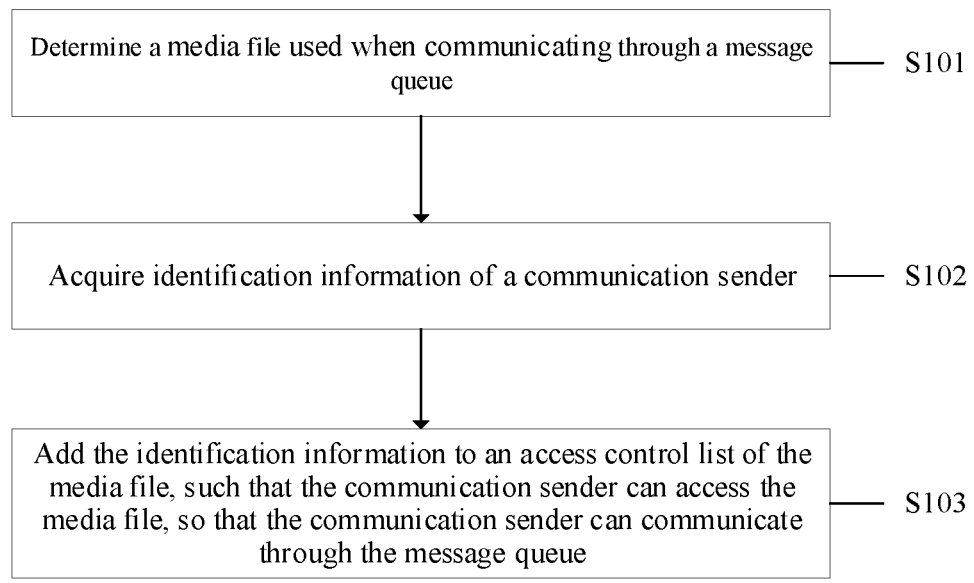
FIG. 1 is a flowchart of a communication method according to an embodiment of this application.

FIG. 1 is a flowchart of a communication method according to an embodiment of this application.

A communication method according to an embodiment of the present application is applicable to a Windows system, and may include the following steps:

Step S101: Determine a media file used when communicating through a message queue.

During actual application, when a Windows system applies a message queue to perform communication, a communication sender needs to rely on a media file created by a communication receiver to perform communication. The media file is created by the communication receiver. Therefore, read and write permissions of the media file both belong to the communication receiver, and as a result the communication sender cannot normally read and write the media file. In particular, when the communication sender and the communication receiver belong to different permission groups, the communication sender and the communication receiver cannot apply a message queue to perform communication. Therefore, the media file used when communicating through the message queue may be first determined.

It should be pointed out that a communication method provided in the embodiments of the present application is applicable to a Windows system, and specifically, may be applied to a server, a computer, and the like installed with a Windows system.

Step S102: Acquire identification information of a communication sender.

During actual application, after the media file used when the communication through the message queue is determined, the identification information of the communication sender may be acquired. A specific type of the identification information of the communication sender may be determined according to an actual requirement. For example, the identification information of the communication sender may be an IP address or the like of the communication sender.

Step S103: Add the identification information to an access control list of the media file, such that the communication sender can access the media file, so that the communication sender can communicate through the message queue.

During actual application, after the identification information of the communication sender is acquired, the identification information may be added to the access control list of the media file, to provide the communication sender with capability of accessing the media file, so that the communication sender may communicate with the communication receiver through the message queue.

A communication method provided in the present application is applied to a Windows system, and includes: determining a media file used when communicating through a message queue; acquiring identification information of a communication sender; and adding the identification information to an access control list of the media file, such that the communication sender can access the media file, so that the communication sender can communicate through the message queue. In the communication method provided in the present application, identification information of the communication sender is added to the access control list of the media file, increasing the probability that the communication sender successfully accesses the media file, and thereby improving the success rate of the communication sender through the message queue, and improving the communication stability of the Windows system.

Figure 2:
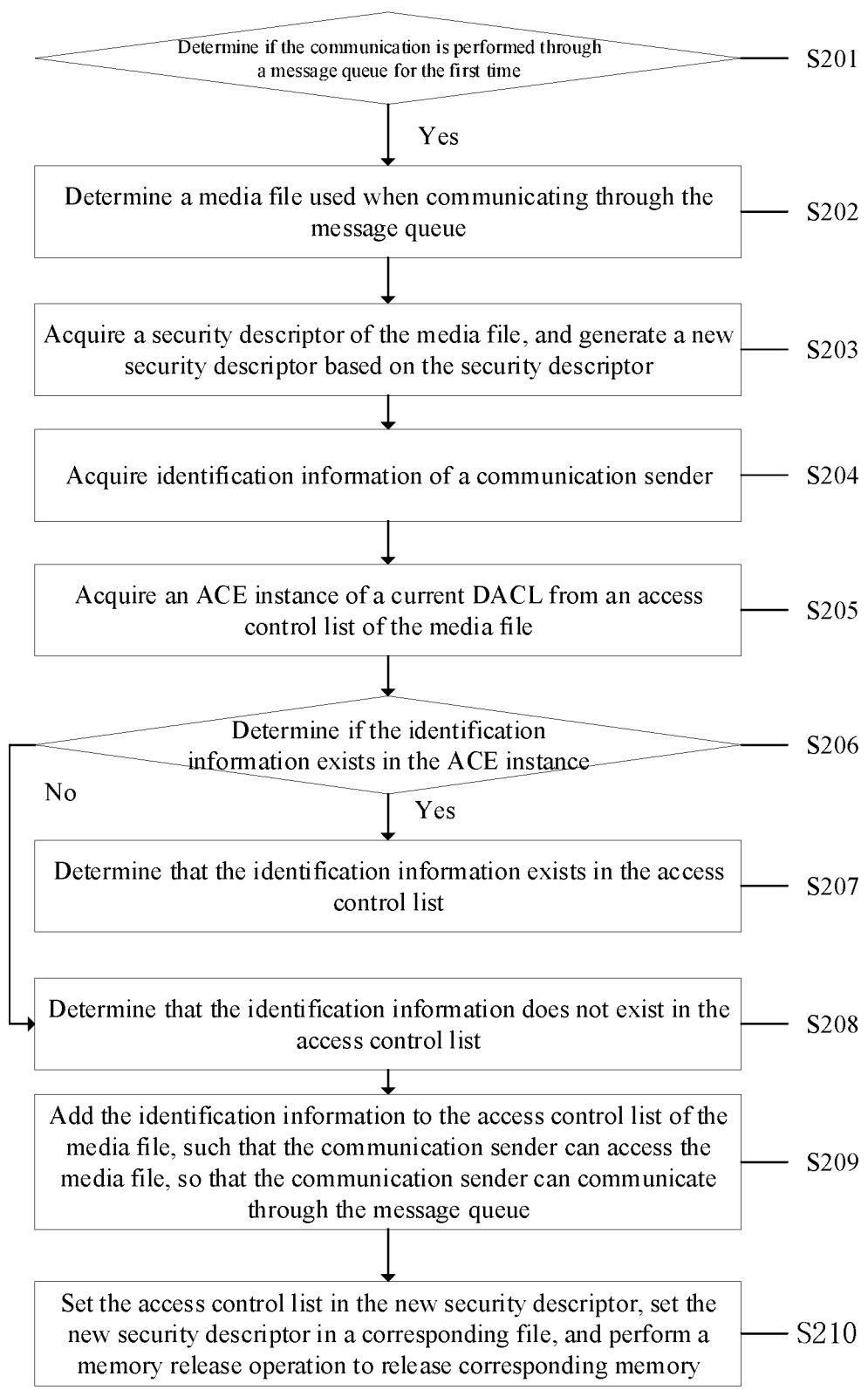
FIG. 2 is another flowchart of a communication method according to an embodiment of this application.

FIG. 2 is another flowchart of a communication method according to an embodiment of this application.

A communication method according to an embodiment of the present application is applicable to a Windows system, and may include the following steps:

Step S201: Determine if the communication is performed through a message queue for the first time, and if the communication is performed through a message queue for the first time, perform step S202.

Step S202: Determine a media file used when communicating through the message queue.

During actual application, to improve the communication efficiency of a Windows system, before the determining a media file used when communicating through a message queue, it may be further determined if the communication is performed through the message queue for the first time, and if the communication is performed through the message queue for the first time, the step of determining a media file used when communicating through a message queue is performed, or if the communication is not performed through the message queue for the first time, the process is ended, thereby avoiding repeating the step of adding the identification information of the communication sender to an access control list of the media file.

Step S203: Acquire a security descriptor of the media file, and generate a new security descriptor based on the security descriptor.

During actual application, to ensure the security of the media file and the access control list of the media file, before the identification information is added to the access control list of the media file, the security descriptor of the media file may further be acquired, and a new security descriptor is generated based on the security descriptor.

In a specific application scenario, a media file path may be acquired by using a function ipcdetail:tmp_filename; the security descriptor of the media file is then acquired base on the media file path by using a function GetFileSecurity; and finally, a new security descriptor is generated by calling a function initialize Security.

Step S204: Acquire identification information of a communication sender.

During actual application, to further avoid repeating the adding the identification information of the communication sender to an access control list of the media file, before the identification information of the communication sender is acquired, it may be first determined if the identification information exists in the access control list, and if the identification information does not exist in the access control list, the step of acquiring identification information of a communication sender is performed, or if the identification information exists in the access control list, the process is ended.

In a specific application scenario, the communication sender may be determined by using a function GetUserName, and then the identification information of the communication sender is acquired by using a function LookupAccountName.

Step S205: Acquire an ACE instance of a current DACL from an access control list of the media file.

In a specific application scenario, the access control list of the media file may be determined by using a function InitializeAcl; and an ACE instance of a current DACL by using a function GetAce.

Step S206: Determine if the identification information exists in the ACE instance, and if the identification information exists in the ACE instance, perform Step S207, or if the identification information does not exist in the ACE instance, end the process.

During actual application, the ACE instance may be accessed to quickly determine if the identification information of the communication sender exists in the access control list.

In a specific application scenario, a function EqualSid may be used to determine if the identification information exists in the access control list.

Step S207: Determine that the identification information exists in the access control list, and end the process.

Step S208: Determine that the identification information does not exist in the access control list, and perform Step S209.

Step S209: Add the identification information to the access control list of the media file, such that the communication sender can access the media file, so that the communication sender can communicate through the message queue.

During actual application, the identification information may be added to the access control list by using a function AddAccessAllowAceEx.

Step S210: Set the access control list in the new security descriptor, set the new security descriptor in a corresponding file, and perform a memory release operation to release corresponding memory.

During actual application, the access control list may be set in the new security descriptor by using a function SetSecurityDescriptorDacl, and the new security descriptor may be set in the corresponding file by using a function SetFileSecurity.

In a specific application scenario, after the identification information is added to the access control list of the media file, the communication sender may further be prompted to communicate through the message queue.

Figure 3:
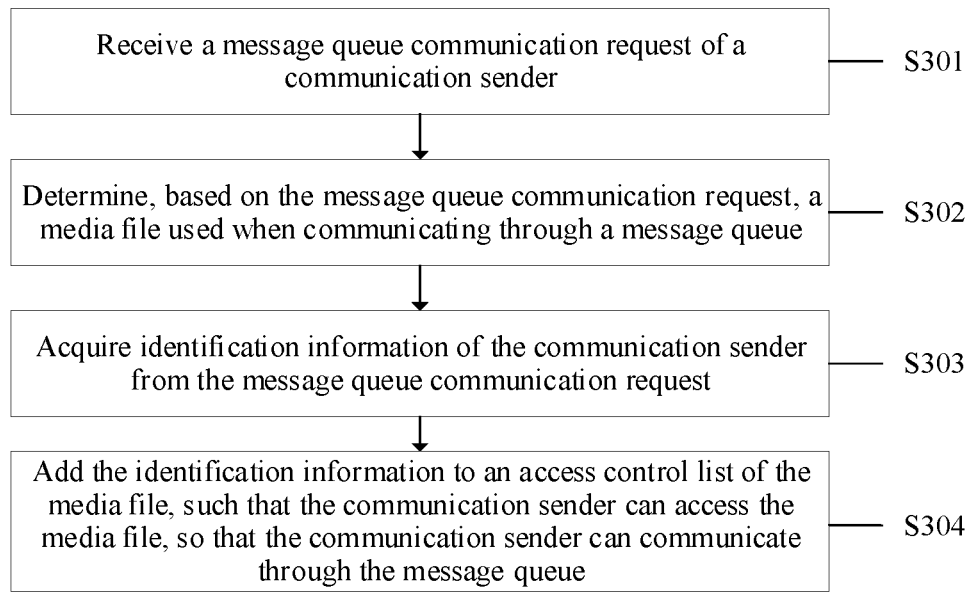
FIG. 3 is a third flowchart of a communication method according to an embodiment of this application.

FIG. 3 is a third flowchart of a communication method according to an embodiment of this application.

A communication method according to an embodiment of the present application is applicable to a communication receiver installed with a Windows system, and may include the following steps:

Step S301: Receive a message queue communication request of a communication sender.

Step S302: Determine, based on the message queue communication request, a media file used when communicating through a message queue.

Step S303: Acquire identification information of the communication sender from the message queue communication request.

Step S304: Add the identification information to an access control list of the media file, such that the communication sender can access the media file, so that the communication sender can communicate through the message queue.

That is, during actual application, after receiving a message queue communication request sent by a communication sender, a communication receiver may determine a required media file based on the message queue communication request, subsequently acquire identification information of the communication sender from the message queue communication request, and subsequently add the identification information of the communication sender to an access control list of the media file, such that the communication sender can access the media file, so that the communication sender can communicate through a message queue.

Figure 4:
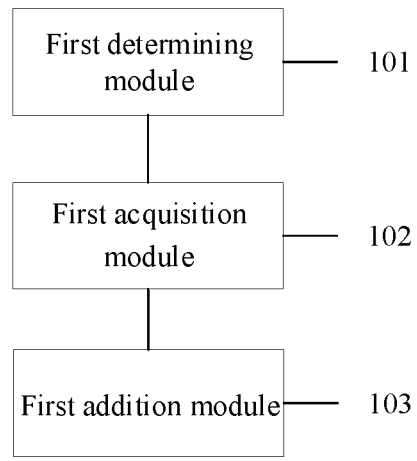
FIG. 4 is a schematic structural diagram of a communication system according to an embodiment of the specification.

FIG. 4 is a schematic structural diagram of a communication system according to an embodiment of the specification.

A communication system according to an embodiment of the present application is applicable to a Windows system, and may include:

a first determining module 101, configured to determine a media file used when communicating through a message queue;

a first acquisition module 102, configured to acquire identification information of a communication sender; and a first addition module 103, configured to add the identification information to an access control list of the media file, such that the communication sender can access the media file, so that the communication sender can communicate through the message queue.

A communication system according to an embodiment of the present application is applicable to a Windows system, and may further include:

a first judgment module, configured to: before the first determination module determines a media file used when communicating through a message queue, determine if the communication is performed through the message queue for the first time, and if the communication is performed through the message queue for the first time, prompt the first determination module to perform the step of determining a media file used when communicating through a message queue is performed, or if the communication is not performed through the message queue for the first time, end the process.

A communication system according to an embodiment of the present application is applicable to a Windows system, and may further include:

a second judgment module, configured to: before the first acquisition module acquires identification information of a communication sender, determine if the identification information exists in the access control list, and if the identification information does not exist in the access control list, prompt the first acquisition module to perform the step of acquiring identification information of a communication sender is performed, or if the identification information exists in the access control list, end the process.

A communication system according to an embodiment of the present application is applicable to a Windows system, and the second judgment module may include:

a first acquiring unit, configured to acquire an ACE instance of a current DACL from the access control list; and a first judgment unit, configured to determine if the identification information exists in the ACE instance, and if the identification information exists in the ACE instance, determine that the identification information exists in the access control list, or if the identification information does not exist in the ACE instance, determine that the identification information does not exist in the access control list.

A communication system according to an embodiment of the present application is applicable to a Windows system, and may further include:

a third acquisition module, configured to: before the first addition module adds the identification information to the access control list of the media file, acquire a security descriptor of the media file;

a first generation module, configured to generate a new security descriptor based on the security descriptor;

a first setting module, configured to: after the first addition module adds the identification information to the access control list of the media file, set the access control list in the new security descriptor; and a second setting module, configured to set the new security descriptor in a corresponding file.

A communication system according to an embodiment of the present application is applicable to a Windows system, and may further include:

a first release module, configured to: after the second setting module sets the new security descriptor in the corresponding file, perform a memory release operation to release corresponding memory.

A communication system according to an embodiment of the present application is applicable to a Windows system, and may further include:

a first prompt module, configured to: after the first addition module adds the identification information to the access control list of the media file, prompt the communication sender to communicate through the message queue.

Figure 5:
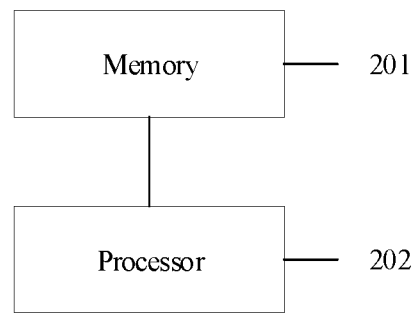
FIG. 5 is a schematic structural diagram of a communication device according to an embodiment of the specification.

The present application further provides a communication device and a computer-readable storage medium, which both have corresponding effects of the communication method provided in the embodiments of the present application. FIG. 5 is a schematic structural diagram of a communication device according to an embodiment of the specification.

A communication device provided in the embodiments of the present application includes a memory 201 and a processor 202. The memory 201 stores a computer program. The processor 202 executes the computer program to implement the following steps:

determining a media file used when communicating through a message queue;

acquiring identification information of a communication sender; and adding the identification information to an access control list of the media file, such that the communication sender can access the media file, so that the communication sender can communicate through the message queue.

A communication device provided in the embodiments of the present application includes a memory 201 and a processor 202. The memory 201 stores a computer program. The processor 202 executes the computer program to implement the following steps: before the determining a media file used when communicating through a message queue, determining if the communication is performed through the message queue for the first time, and if the communication is performed through the message queue for the first time, performing the step of determining a media file used when communicating through a message queue is performed, or if the communication is not performed through the message queue for the first time, ending the process.

A communication device provided in the embodiments of the present application includes a memory 201 and a processor 202. The memory 201 stores a computer program. The processor 202 executes the computer program to implement the following steps: before the acquiring identification information of a communication sender, determining if the identification information exists in the access control list, and if the identification information does not exist in the access control list, performing the step of acquiring identification information of a communication sender is performed, or if the identification information exists in the access control list, ending the process.

A communication device provided in the embodiments of the present application includes a memory 201 and a processor 202. The memory 201 stores a computer program. The processor 202 executes the computer program to implement the following steps: acquiring an ACE instance of a current DACL from the access control list; and determining if the identification information exists in the ACE instance, and if the identification information exists in the ACE instance, determining that the identification information exists in the access control list, or if the identification information does not exist in the ACE instance, determining that the identification information does not exist in the access control list.

A communication device provided in the embodiments of the present application includes a memory 201 and a processor 202. The memory 201 stores a computer program. The processor 202 executes the computer program to implement the following steps: before the adding the identification information to an access control list of the media file, acquiring a security descriptor of the media file, and generating a new security descriptor based on the security descriptor; correspondingly, after the adding the identification information to an access control list of the media file, setting the access control list in the new security descriptor; and setting the new security descriptor in a corresponding file.

A communication device provided in the embodiments of the present application includes a memory 201 and a processor 202. The memory 201 stores a computer program. The processor 202 executes the computer program to implement the following step: after the setting the new security descriptor in the corresponding file, performing a memory release operation to release corresponding memory.

A communication device provided in the embodiments of the present application includes a memory 201 and a processor 202. The memory 201 stores a computer program. The processor 202 executes the computer program to implement the following step: after the adding the identification information to an access control list of the media file, prompting the communication sender to communicate through the message queue.

Figure 6:
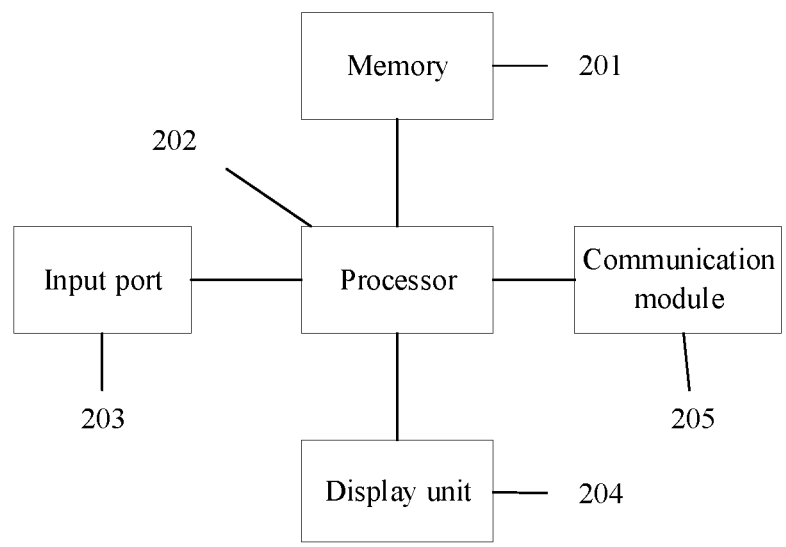
FIG. 6 is another schematic structural diagram of a communication device according to an embodiment of the specification.

Referring to FIG. 6, another communication device provided in the embodiments of the present application may further include: an input port 203 connected to the processor 202 and configured to transmit a command inputted from the outside into the processor 202; a display unit 204 connected to the processor 202 and configured to display a processing result of the processor 202 to the outside; and a communication module 205 connected to the processor 202 and configured to implement communication between the communication device and the outside. The display unit 204 may be a display panel, a laser scanning display, or the like. Communication methods used by the communication module 205 include, but not limited to, Mobile High-Definition Link (MHL) technology, Universal Serial Bus (USB), High-Definition Multimedia Interface (HDMI), and wireless connections: Wireless Fidelity (Wi-Fi) technology, Bluetooth communication technology, Bluetooth Low Energy communication technology, and communication technology based on IEEE802.11s.

Embodiments of the present application provide a computer-readable storage medium. The computer-readable storage medium stores a computer program. A processor is configured to execute the computer program to implement the following steps:
determining a media file used when communicating through a message queue;
acquiring identification information of a communication sender; and
adding the identification information to an access control list of the media file, such that the communication sender can access the media file, so that the communication sender can communicate through the message queue.

Embodiments of the present application provide a computer-readable storage medium. The computer-readable storage medium stores a computer program. A processor is configured to execute the computer program to implement the following steps: before a media file used when communicating through a message queue is determined, determining if the communication is performed through the message queue for the first time, and if the communication is performed through the message queue for the first time, prompting the first determination module to perform the step of determining a media file used when communicating through a message queue is performed, or if the communication is not performed through the message queue for the first time, ending the process.

Embodiments of the present application provide a computer-readable storage medium. The computer-readable storage medium stores a computer program. A processor is configured to execute the computer program to implement the following steps: before the acquiring identification information of a communication sender, determining if the identification information exists in the access control list, and if the identification information does not exist in the access control list, performing the step of acquiring identification information of a communication sender is performed, or if the identification information exists in the access control list, ending the process.

Embodiments of the present application provide a computer-readable storage medium. The computer-readable storage medium stores a computer program. A processor is configured to execute the computer program to implement the following steps: acquiring an ACE instance of a current DACL from the access control list; and determining if the identification information exists in the ACE instance, and if the identification information exists in the ACE instance, determining that the identification information exists in the access control list, or if the identification information does not exist in the ACE instance, determining that the identification information does not exist in the access control list.

Embodiments of the present application provide a computer-readable storage medium. The computer-readable storage medium stores a computer program. A processor is configured to execute the computer program to implement the following steps: before the adding the identification information to an access control list of the media file, acquiring a security descriptor of the media file, and generating a new security descriptor based on the security descriptor; correspondingly, after the adding the identification information to an access control list of the media file, setting the access control list in the new security descriptor; and setting the new security descriptor in a corresponding file.

Embodiments of the present application provide a computer-readable storage medium. The computer-readable storage medium stores a computer program. A processor is configured to execute the computer program to implement the following steps: after the setting the new security descriptor in the corresponding file, performing a memory release operation to release corresponding memory.

Embodiments of the present application provide a computer-readable storage medium. The computer-readable storage medium stores a computer program. A processor is configured to execute the computer program to implement the following steps: after the adding the identification information to an access control list of the media file, prompting the communication sender to communicate through the message queue.

The computer-readable storage medium used in the present application may include a random access memory (RAM), a memory, a read-only memory (ROM), an electrically programmable ROM, an electrically erasable programmable ROM, a register, a hard disk, a removable disk, a CD-ROM, or any other form of storage medium known in the art.

For description of related parts in the communication system and device and computer-readable storage medium provided in the embodiments of the present application, reference may be made to detailed description of the corresponding part in the communication method provided in the embodiments of the present application. Details are not described again herein. In addition, the part of the above technical solutions provided in the embodiments of the present application that is consistent with the implementation principle of the corresponding technical solution in the prior art is not described in detail to avoid excessive redundancy.

All embodiments are described in the present invention by using the progressive method. Each embodiment describes only the difference from other embodiments. For the same or similar parts among all embodiments, reference may be made to the relevant parts. For the apparatus disclosed in the embodiments, because the apparatus corresponds to the method disclosed in the embodiments, the description is relatively simple. For related parts, reference may be made to the description of the method part.

A person skilled in the art may further be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. If the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be directly implemented by hardware, a software module executed by a processor, or a combination thereof. The software module may reside in a RAM, a memory, a ROM, an electrically programmable ROM, an electrically erasable programmable ROM, a register, a hard disk, a removable disk, a CD-ROM, or any other form of storage medium known in the art.

Finally, it should be noted that the relational terms herein such as first and second are used only to differentiate an entity or operation from another entity or operation, and do not require or imply any actual relationship or sequence between these entities or operations. Moreover, the terms "comprise", "include", or any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the object or the device which includes the element.

The foregoing description of the disclosed embodiments is presented to enable persons skilled in the art to implement or use the present application. Various modifications to these embodiments are readily apparent to persons skilled in the art. The general principle defined herein may be implemented in other embodiments without departing from the spirit or scope of the present application. Thus, the present application is not to be limited to these embodiments shown herein, but are to be accorded the widest scope consistent with the principles and novel features disclosed herein.

The invention claimed is:

1. A communication method, applied to a Windows® system, comprising:
   determining that a communication is performed through a message queue for the first time;
   determining a media file used when communicating through the message queue;
   determining if identification information of a communication sender exists in an access control list of the media file by acquiring an access control entry (ACE) instance of a current discretionary access control list (DACL) from the access control list and determining if the identification information exists in the ACE instance;
   acquiring identification information of the communication sender when the identification information does not exist in the ACE instance;
   acquiring a security descriptor of the media file and generating a new security descriptor based on the security descriptor;
   adding the identification information to the access control list, such that the communication sender can access the media file, so that the communication sender can communicate through the message queue;
   setting the access control list in the new security descriptor;
   setting the new security descriptor in a corresponding file; and
   performing a memory release operation to release corresponding memory.

2. The method according to claim 1, wherein after the adding the identification information to the access control list of the media file, the method further comprises:
   prompting the communication sender to communicate through the message queue.

3. A communication device, applied to a Windows® system, and comprising:
   a memory, configured to store a computer program; and
   a processor, configured to execute the computer program to implement the steps of the communication method according to claim 1.

4. A non-transitory computer readable storage medium, applied to a Windows® system, the non-transitory computer-readable storage medium storing a computer program, the computer program being executed by a processor to implement the steps of the communication method according to claim 1.

* * * * *